2 Sheets—Sheet 1.

J. R. KENWORTHY.
Change Box and Register.

No. 218,276. Patented Aug. 5, 1879.

WITNESSES

INVENTOR

By

ATTORNEY

J. R. KENWORTHY.
Change Box and Register.
No. 218,276.  Patented Aug. 5, 1879.
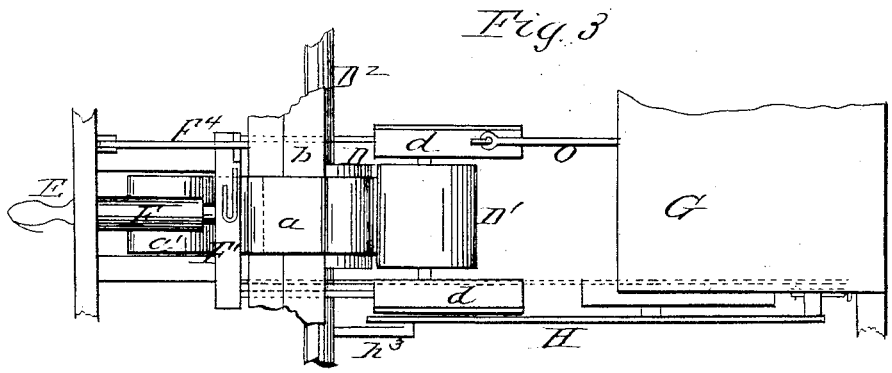
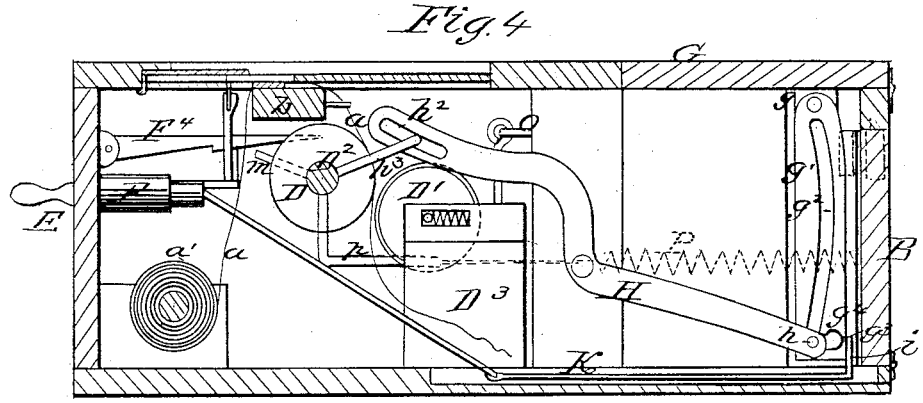

UNITED STATES PATENT OFFICE.

JOHN R. KENWORTHY, OF RICHMOND, INDIANA.

IMPROVEMENT IN CHANGE BOX AND REGISTER.

Specification forming part of Letters Patent No. 218,276, dated August 5, 1879; application filed May 1, 1879.

*To all whom it may concern:*

Be it known that I, JOHN R. KENWORTHY, of Richmond, in the county of Wayne and State of Indiana, have invented certain new and useful Improvements in Cash-Registers; and I do hereby declare the following to be a full, clear, and exact description of the invention, such as will enable others skilled in the art to which it pertains to make and use it, reference being had to the accompanying drawings, which form part of this specification, in which—

Figure 1:
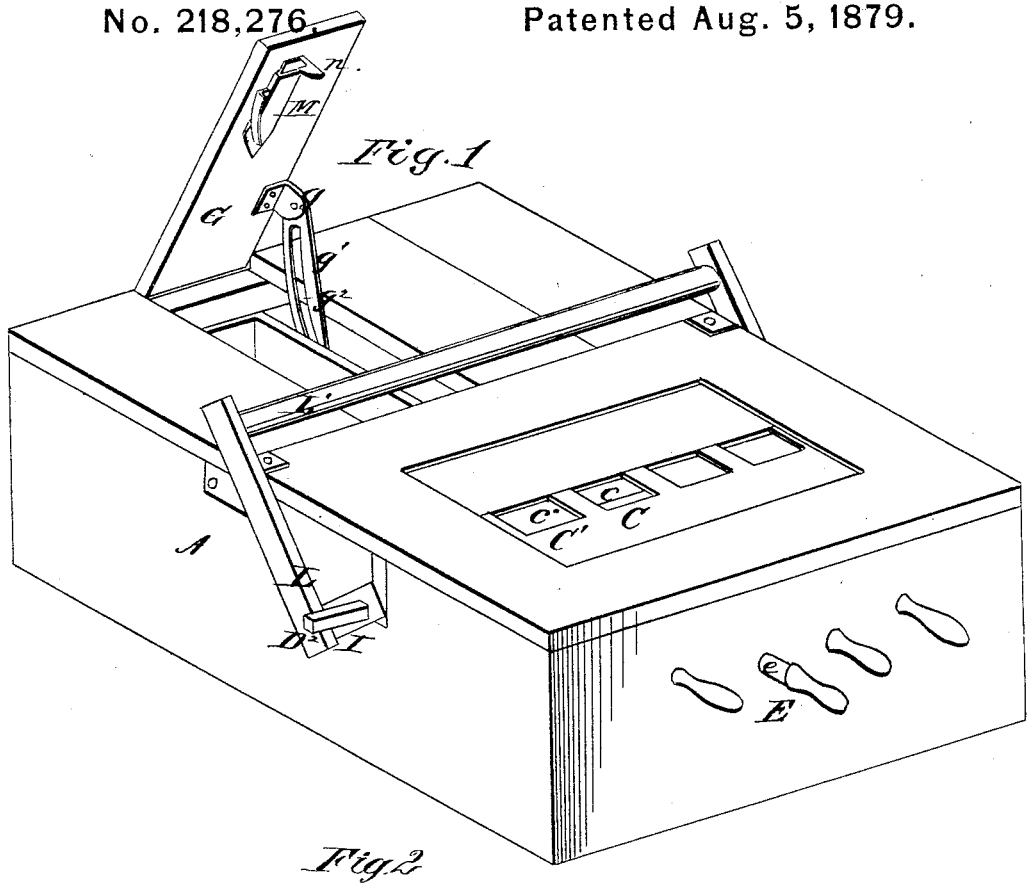
Figure 2:
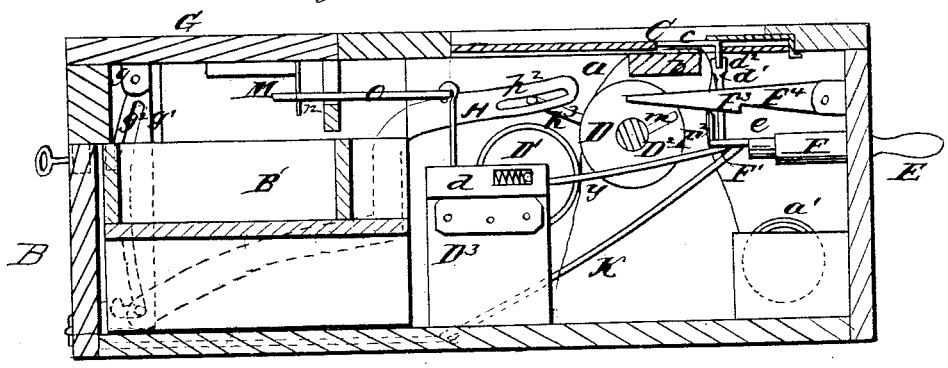

Figure 1 is a perspective view of my invention. Figs. 2 and 4 are transverse vertical sectional views. Fig. 3 is a plan view of details.

This invention has relation to a mechanical contrivance or apparatus designed for use in stores and other mercantile establishments wherein cash sales are effected by clerks or hired salesmen.

The object of this invention is to provide means for keeping an accurate account or record of the individual and aggregate sales of the respective clerks or salesmen, and for receiving and holding the corresponding cash receipts, whereby the necessity of a general cashier is obviated, and each clerk or salesman made cashier on his own behalf, and controller of his own accounts, within the bounds of honesty and regularity, and whereby cheating or dishonesty on the part of salesmen toward proprietor or proprietor toward salesmen is prevented.

This invention accordingly consists, first, in the provision and novel arrangement of a register or record-slip, upon which is kept a record, account, or memorandum of sale receipts, and of mechanical means for moving said slip and, in connection therewith or adjunct thereto, controlling access to a money till, box, or drawer, whereby, after registration of a sale and a corresponding deposit of cash, any manipulation or tampering with the apparatus for dishonest purposes will be followed by indications leading to detection; second, in the provision of a separate record-slip and cash-drawer for each clerk or salesman; third, in the method and means for controlling access to the respective cash-drawers on the part of foreman or proprietor and clerks, so that neither can gain access to a drawer without the co-operation of the other; fourth, in the novel construction, combination, and arrangement of details, as hereinafter described and claimed.

The apparatus embodying my invention is designed to be placed on the cash-desk, where cash for sales is passed through a small opening or wicket.

The front part of the apparatus contains the register-slips and the mechanism for exposing and moving the same. The inner portion contains the cash-drawers for each salesman. The exposure of the record-slip is controlled by a knob in front, which, being pulled out, withdraws a plate or slide covering the slip. The amount of sale is written upon this slip. The hand is then passed through the cash window or wicket, and in the act a lever moved, and thereby the lid of the drawer raised, and at the same time the slip carried forward. By the same movement of the lever devices controlling or essential to the movement of the slip are tripped or disconnected, so that, when the hand is withdrawn and the drawer-lid allowed to fall, it cannot be again lifted without resetting the tripped mechanism. The lid cannot be then lifted without a corresponding movement of the slip. Hence any attempt to feloniously open the lid is sure of detection.

Referring to the accompanying drawings, A designates a box or chest containing the mechanism and devices embodying my invention. B is a door to the inner end or face of said chest, opening downward upon hinges, and secured, when shut, by a lock, the key of which is retained by the foreman of the establishment or his substitute. The cavity or space behind this door contains the money-drawers B', &c., each provided with a lock, and the key thereof in the possession of the salesman or clerk to whom respectively the drawers are assigned.

Under this arrangement the clerks are precluded from individual access to the drawers, while the foreman or proprietor cannot reach them without the aid of the clerks. Hence, after cash is deposited in the drawers, the clerks cannot feloniously abstract the same, nor can the proprietor tamper therewith to the injury of his clerks.

C C', &c., designate apertures in the top of the forward or outer portion of the chest, and $c\ c'$, &c., are sliding plates moving in suitable ways or guides, and adapted to cover or close said apertures. Beneath these apertures are located the registering-slips, consisting of strips of paper $a$, passing from rolls $a'$ over a cushioned bar, $b$, and thence downward between two rollers, $D\ D^1$, having surfaces properly prepared, so that when the paper is closely impinged upon by both rollers, and the latter rotated, the paper will be caused to move in the direction of the length of the strips. Thus the roller D may have a sanded or otherwise roughened surface, while the roller $D^1$ is covered with felt.

Roller D is fixed upon a horizontal transverse shaft, $D^2$, while roller $D^1$ is situated in movable spring-bearings upon standards $D^3$, so that it may be brought into close proximity with or separated from roller D. This adjustment is effected through mechanism connected with the knobs by which the exposure of the recording-slip is obtained.

E designates said knobs, and $e$ the stems thereof, passing through the front of the chest A and through guide-sleeves F. Upon their inner ends these stems hold plates or bars $F^1$, which, being connected to the movable bearings $d$ of the roller $D^1$ by rods T, cause said roller to be drawn toward roller D when the knob is pulled out, and to thereby obtain the necessary hold or purchase upon the paper strip for the subsequent moving of the same.

The cross-bar $F^1$ is provided with an arm, bent rod, or equivalent device, $d^1$, which engages with a stud, $d^2$, depending from the under side of the sliding plate $c$, so that in pulling out the knob the slide is withdrawn and the strip uncovered. The bar $F^1$ has also a stud or catch, $F^2$, which, when the bar is drawn back by the pulling of the knob, engages with a tooth, $F^3$, on a dog, $F^4$, which is pivoted to the inner side of the front of the chest, as shown. This engagement detains the parts in the position to which they have been brought by the pulling of the knob while the entry is being made upon the strip, and until the cash is about to be deposited.

Now, let us suppose that salesman No. 1 has sold five dollars' worth. He approaches the cash-desk, pulls out knob E, exposing the strip, upon which he notes down the amount received, "$5.00." He must next deposit a corresponding amount, so that the drawer and strip shall "tally," and accordingly must obtain access to his drawer. This he accomplishes by raising the lid G thereof through the agency of mechanism as follows: The lid G has depending from its under side an ear, $g$, upon which is hung or pivoted a plate, $g^1$, having cut it in a long curved slot, $g^2$, terminating at its lower end in a horizontal branch, $g^4$, enlarged at its extremity to form a recess, $g^3$. A double-elbow or bell-crank lever, H, pivoted within the chest beside the drawer, is furnished with a stud, $h$, which plays in the slot $g^2$. At its other end the lever H has a curved slot, $h^2$, in which plays the arm of a crank, $h^3$, attached to the shaft $D^2$. The shaft $D^2$ has cranks I connected to a lever-frame, I', by tilting which the shaft is partly rotated. By simply rotating this shaft, without any previous preparation, the bell-crank lever moves on its fulcrum, being actuated by the crank $h^3$ without opening the lid of the drawer, the stud $h$ merely playing through the slot $g^2$.

To cause the lid to be raised, the plate $g^1$ must be moved so that the stud $h$ shall enter the recess at the extremity of the branch $g^4$. This movement is controlled through the agency of a rod, K, having its forward end coupled to the bar $F^1$, and its rear end provided with a finger, $i$, which rises behind the plate. When the knob is pulled out to expose the strip the finger $i$ pushes the plate forward, and thus causes the necessary engagement between the plate and elbow-lever, so that when the lever-frame L' is tilted the lid of the drawer will be raised and its elevation maintained long enough to allow the cash to be dropped in; but while this is taking place the recording-strip is being moved forward, in consequence of the rotation of the shaft $D^2$. This shaft is furnished with arm $m$, which, when the lever-frame has reached its lowest point of depression or has been sufficiently tilted to raise the lid of the drawer, comes in contact with the dog $F^4$, which is disengaged from the bar $F^1$, and the knob and movable roller $D^1$ allowed to regain their normal positions.

As soon as the hand is withdrawn, allowing the lever-frame L' to rise, which it does automatically, the movement of the double-elbow lever is reversed, and the lid falls and is locked. The lid can only be raised again by a repetition of the successive acts of withdrawing the knob and tilting the lever, and as the pulling of the knob and moving of the lever cause the paper strip to be carried along, it is obvious that any such acts cannot be performed without the fact becoming known when the contents of the till and the record on the slip are compared.

The lid is locked by means of a pivoted spring-catch, M, having a beveled head, $n$. A bolt, O, running back from one of the movable bearings of the roller $D^1$, engages automatically with said catch when the lid falls, and is released therefrom when the knob is pulled out and the roller moved. The bolt may, however, be attached to any other movable part co-operating properly with the knob.

The automatic raising of the lever-frame is effected through the control of a spring, P, attached to the inside of the chest A, and connected to a crank-arm, $p$, on the shaft $D^2$, as shown.

The forward portion of the top of the case A is hinged or otherwise secured, so that it may under proper conditions be removed to give access to the interior.

It will be understood that the apparatus may be furnished with as many registering-strips, with their respective feeding-rollers, knobs, drawers, &c., as there are salesmen employed, or as may be requisite.

It is manifest that in mechanical details the apparatus for carrying out my invention may be modified. There are many ways in which coaction of knobs, registering-strips, &c., may be effected. It is not essential, for instance, that the strip should be grasped between two rollers, one of which has movable bearings. Instead of this arrangement the paper may be wound from one shaft or drum to another, and direct connection made between the bolt of the drawer-lid and the knob. The movement of the strip may then take place through the intervention of pawl-and-ratchet mechanism, or other suitable contrivance. I do not suggest these modifications for the purpose of basing specific claims thereon, but to show that I am not limited in mechanical resources, and that I do not wish to be confined to any set organization of parts.

My invention is, broadly, a cash register, recorder, or accountant, embracing the features of a recording-strip, or its equivalent, upon which the money-receipts are marked, and a drawer or receptacle, under connected mechanical control, to receive amounts corresponding to the figures upon the strip, the operations being performed either through the agency of the devices and combinations described or their mechanical equivalents.

In establishments preferring to continue in a measure the system of cash-tickets sent to the cash-desk or carried thereto by the salesman, the strip or the tickets may be prepared with mucilage or other adhesive material, and the tickets pasted upon the strip according as they accrue.

Having described my invention, I claim as new and desire to secure by Letters Patent—

1. In a register for cash-receipts, the combination of a registering strip or ribbon adapted to be written upon or otherwise marked, and having an intermittent motion of the knob, the drawer-lid, and mechanism, substantially as described, for moving said strip and opening said lid, as and for the purpose set forth.

2. The combination, with the recording or registering strip or ribbon and the rollers or equivalent devices through which the same is moved, of the crank-shaft $D^2$, lever or lever-frame, drawer-lid, and intermediate mechanism, substantially as described, whereby, upon depressing said lever, the lid will be raised, for the purpose set forth.

3. The combination, with the register strip or ribbon and the rollers or equivalent devices through which intermittent motion is imparted to the same, of the knob E, shaft $D^2$, lever $L'$, drawer-lid G, and intermediate and appurtenant mechanism, substantially as described, whereby, after withdrawing said knob to expose the strip, the latter is caused to move and the lid to rise upon depressing the lever $L'$, as and for the purpose set forth.

4. The combination, with the knob E, drawer-lid G, shaft $D^2$, and mechanism, substantially as described, for causing said lid to be lifted through the movement of said shaft, of devices, substantially as described, for bringing such mechanism into effective engagement when the knob is pulled, and prior to the depression of the lever.

5. The combination, with devices, substantially as described, for controlling the movement of the register-strip and causing the drawer-lid to be lifted, of a bolt and latch locking said lid and co-operating with said devices, so that unlocking may take place only upon setting said devices to insure a movement of the strip upon opening said lid.

6. The combination, with the shaft $D^2$, lever-frame $L'$, and drawer-lid G, operated therefrom, of the spring P, substantially as described.

7. The combination, with the knob E and record-slip $a$, of the movable plate $c$, substantially as described.

8. The combination, with the knob E, of the dog $F^4$ and plate $F^1$, having stud to engage with said dog, as and for the purpose set forth.

9. The combination, with the knob E, dog $F^4$, and studded plate $F^1$, of the shaft $D^2$, having an arm to lift said dog, for the purpose set forth.

10. The combination, with the adjustable feed-roller $D^1$, shaft $D^2$, and feed-roller D, of knob E, connections, substantially as described, for adjusting roller $D^1$ by withdrawal of knob, and mechanism, as set forth, for rotating said rollers and causing the slip to move, as and for the purpose specified.

11. The combination, with the drawer-lid G and mechanism, substantially as described, for actuating the same from the shaft $D^2$, of means, substantially as described, for bringing said mechanism into engagement by the withdrawal of the knob E, as set forth.

12. The combination, with the drawer-lid G, having a spring-latch, of the bolt O, knob E, and intermediate mechanism, substantially as described, for withdrawing said bolt, connected to and operated through the medium of the knob E, as specified.

In testimony that I claim the foregoing I have hereunto set my hand.

JOHN R. KENWORTHY.

Witnesses:
B. F. DEAL,
ISAAC COMMONS.